United States Patent [19]

Mosher et al.

[11] Patent Number: 4,534,428
[45] Date of Patent: Aug. 13, 1985

[54] VIBRATORY FEEDER CONTROL FOR A WEIGHING SYSTEM

[75] Inventors: Oren A. Mosher, Hayward; Ellwood S. Douglas, Orinda, both of Calif.

[73] Assignee: Package Machinery Co., East Longmeadow, Mass.

[21] Appl. No.: 522,418

[22] Filed: Aug. 11, 1983

[51] Int. Cl.³ .................... G01G 19/22; G01G 19/32
[52] U.S. Cl. ................................ 177/1; 177/50; 177/64
[58] Field of Search ............ 177/50, 64, 66, DIG. 11, 177/1, 25, 121, 145, DIG. 12; 198/533, 752, 762

[56] References Cited

U.S. PATENT DOCUMENTS

| | | | |
|---|---|---|---|
| 2,376,791 | 5/1945 | Lindsay | 198/762 |
| 2,407,357 | 9/1946 | Weyandt | 198/762 |
| 2,729,213 | 1/1956 | Broekhuysen et al. | 177/121 X |
| 3,498,395 | 3/1970 | Henry | 177/1 |
| 3,944,004 | 3/1976 | Lafitte et al. | 177/121 |
| 4,100,984 | 7/1978 | Klopfenstein et al. | 177/50 |
| 4,129,189 | 12/1978 | Maglecic et al. | 177/123 |
| 4,313,507 | 2/1982 | Hays | 177/1 |
| 4,341,274 | 7/1982 | Hirano et al. | 177/25 |
| 4,396,078 | 8/1983 | Minamida et al. | 177/1 |
| 4,397,364 | 8/1983 | Hirano | 177/25 |
| 4,398,612 | 8/1983 | Mikami et al. | 177/25 |
| 4,448,272 | 5/1984 | Keller et al. | 177/1 |
| 4,484,645 | 11/1984 | Inoue | 177/25 |

Primary Examiner—E. A. Goldberg
Assistant Examiner—Fred L. Kampe
Attorney, Agent, or Firm—McCormick, Paulding & Huber

[57] ABSTRACT

A combination weighing machine has a plurality of scales that are periodically dumped and reloaded with products from a bulk container. In each cycle of machine operation, the loaded scales are surveyed, and a combination of the scales which most accurately yields a desired target weight is dumped into a single package. The dumped scales are then reloaded and the process is repeated. Each of the scales has an associated vibratory feeder and accumulator which receives the product from the bulk container and dispenses the product to the scale as needed. In order to feed the scales with loads that provide a large selection of combinations close to the target weight, a control for the vibratory feeders regulates the duration and amplitude of the vibrations in accordance with the loads measured in preceding machine cycles. Also described is a method of dealing with inactive scales by feeding small quantities of articles to the scales requiring reloading until the inactive scales are dumped.

16 Claims, 7 Drawing Figures 4,534,428

VIBRATORY FEEDER CONTROL FOR A WEIGHING SYSTEM

BACKGROUND OF THE INVENTION

The present invention relates to weighing machines and is concerned in particular with control of vibratory feeders that dispense product from a bulk container to automated scales.

Vibratory feeders for dispensing product from bulk storage in a controlled stream are well known in the art and have been used before in weighing machines to load the product into a weigh scale. In most combination weighing machines, which operate in a cyclic manner, the vibratory feeders discharge into an accumulator located between the associated scale and the feeder, and the accumulator holds the product until the scale is dumped and ready to receive another charge of product.

It has been determined that in combination weighing machines, the target weight will be achieved or will be most closely approximated with highest probability when the number of dumped scales is approximately half or a third of the total number of scales searched. As the ratio of dumped scales to available scales goes up, the number of viable combinations goes down, and as the number of dumped scales goes down, the graduations of the combination weights become relatively coarse. Departure either way from the targeted number of dumped scales lowers the probability of accurately achieving the target weight. The targeted number can be controlled by causing the quantity or charge of product loaded into the scales to generally fall within the fractional part of the target weight which would permit about one half of the scales in the system to form the target weight.

Vibratory feeders for scales are not precision devices, and therefore, the quantity of product dispensed during a loading operation varies from one feed cycle to the next. Furthermore, in a machine having a plurality of scales, the feeders and the associated distribution system to the feeders from a bulk container may operate with different efficiencies and produce widely divergent charges.

It is accordingly a general object of the present invention to provide a vibratory feeder control that regulates the feeder operation and produces a charge or load in a scale that comes closer to a desired feed weight or allows a target weight to be produced with greater accuracy.

SUMMARY OF THE INVENTION

The present invention resides in a cyclically operated weighing machine having a weigh scale for measuring a selected weight of product to be deposited in a product package. A vibratory feeder having a vibrator is associated with the weigh scale for dispensing the product from a bulk container in a controlled stream.

An improved control for the vibratory feeder comprises sensing means for determining from the weigh scale the weight of product dispensed by the feeder over a given period of time. For example, a sensing means may include the weight sensor which produces a signal indicative of the weight in the scale in the weighing process. Comparing means connected with the sensing means measures the difference between the dispensed weight of product and a desired feed weight and produces a signal indicative of the difference. The difference signal is then utilized by a vibrator control means connected to the vibrator feeder for regulating the vibrations. For example, the amplitude of the vibrations may be increased to increase the quantity of product loaded, or decreased to decrease the quantity. The duration of the vibrations may also be increased or decreased to produce a corresponding change in the quantity of loaded product.

Although feeders are not intended to provide accurate measures of product, by exercising control over the feeders a desired feed weight is more closely approximated. In a combination system a plurality of approximate feed weights permits the target weight to be achieved with greater accuracy and probability.

DESCRIPTION OF PREFERRED EMBODIMENTS

Figure 1:
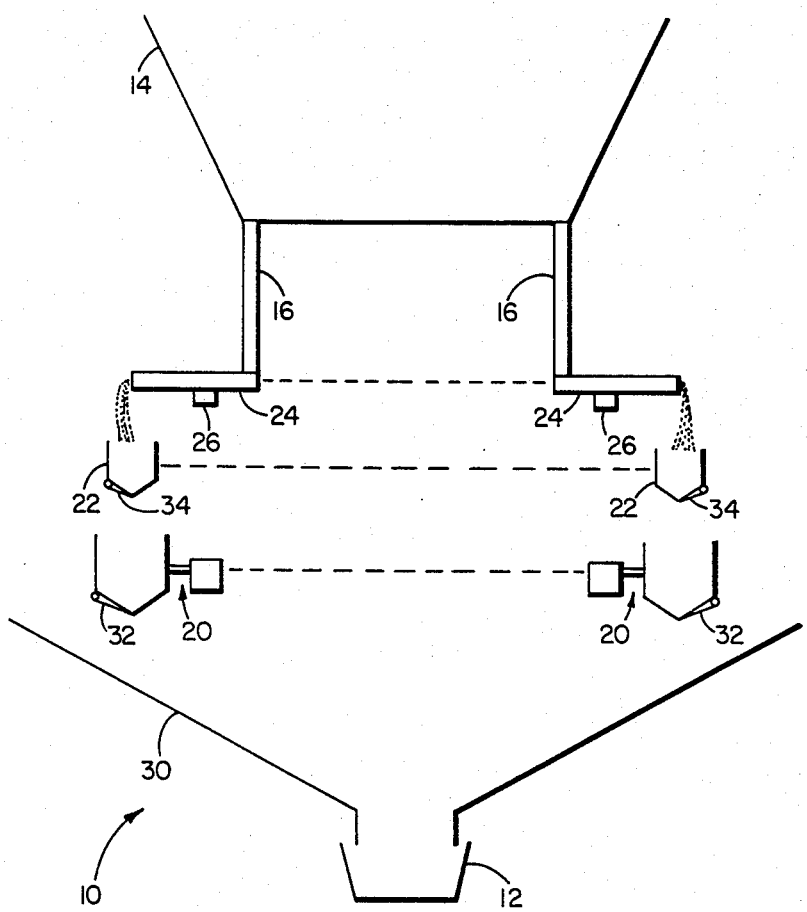
FIG. 1 is a schematic illustration of a combination weighing machine having a plurality of weigh scales and associated vibratory feeders and accumulators.

In FIG. 1 a combination weighing machine, generally designated 10, is illustrated schematically as part of a larger packaging machine that prepares a package 12 during each cycle of operation. The weighing machine receives quantities of a finely divided product, such as candies, nuts, fruits, etc., from a bulk container 14 through a plurality of distribution chutes 16, and in a sequence of steps weighs and combines measured quantities of the product to yield in a package 12 a total weight of product equal to or closely approximating a target weight.

The weighing machine 10 includes a plurality of weigh scales 20, each of which has a sensor, such as a strain gauge, that produces a calibrated output signal representing the weight of product that has been dispensed into the scale from a corresponding accumulator 22. Although only two scales are shown, the dotted lines indicate that a multiplicity scales substantially greater than three may be employed. For example, in small combination machines, ten scales may be used, while in larger machines, 20 or more scales may be employed.

The plurality of accumulators are in turn loaded by a plurality of vibratory feeders 24, which receive the product from the bulk container 14 through the distribution chutes 16. Each feeder 24 includes an electrically excited vibrator 26 that is connected to the underside of the feeder tray, and when the vibrator is energized, the product P flows or is dispensed from one end of the tray in a stream and falls into the associated accumulator 22. As explained in greater detail below, the excitation of the vibrator is regulated in order to coarsely meter the quantity of product that is dumped into the accumulator and subsequently into the associated weigh scale 20 for accurate measurement. Interposing accumulators between the vibratory feeders 24 and the associated scales speeds up the operation of the machine by permitting selected scales to dump their loads of product into the package 12 through the collecting chute 30 of the packaging machine while another charge of product is prepared or held in waiting in the accumulator. As soon as a weigh scale has emptied its load and the scale door 32 closes, product can be received through the door 34 on the accumulator for the next weighing operation.

Figure 2:
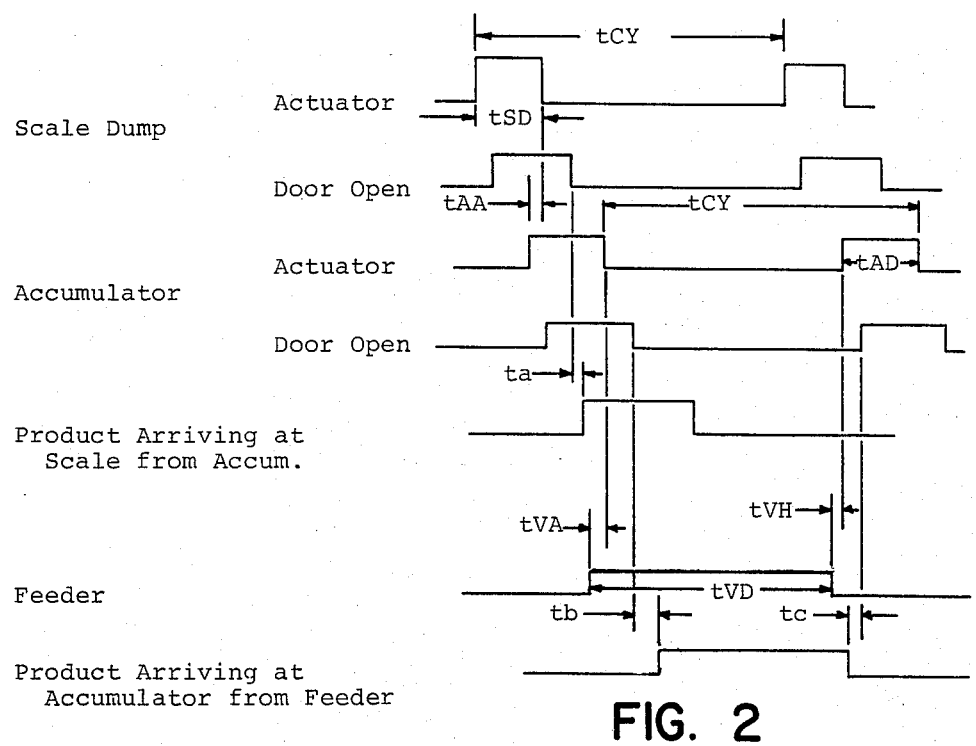
FIG. 2 is a timing diagram illustrating the periods of operation of an associated feeder, accumulator, and scale illustrated in FIG. 1.

FIG. 2 is a timing diagram that illustrates the operating times of the various components associated with a particular scale and the scale itself. The operating times are critical because they affect the actual charges of product that are available for combination, and because errors in delivery of the product to the scales may reduce the probability of achieving the target weight. For example, if the accumulator door 34 opens too soon, incoming product dispensed from the vibrator tray may fall through the door and be delivered with an outgoing batch of product, or may be caught in the scale door as it closes, and cause a leak during feeder operation. If the vibrator starts too soon, product may be caught in the accumulator door as it closes and cause a leak into the scale. A leak into the underlying scale prevents an accurate weight measurement, and if the leak continues while the scale is dumped, product may fall directly into the package without being detected by the scale at all.

All of the dispensing, weighing, and dumping operations are carried out in a cyclic fashion, and all must be completed within a fixed cycle time tCY. FIG. 2 shows the following periods of operation for various components in the weighing machine:

| tCY | Duration of a cycle | (Independent Variable) |
|---|---|---|
| tSD | Scale Dump Duration | (Setup Values Chosen by Operator) |
| tAD | Accumulator Drop Duration | (Setup Values Chosen by Operator) |
| tAA | Accumulator Anticipation | (Setup Values Chosen by Operator) |
| tVA | Vibrator Anticipation | (Setup Values Chosen by Operator) |
| tVH | Vibrator Holdoff | (Setup Values Chosen by Operator) |
| tVD | Vibrator Duration (maximum shown) | (Setup Values Chosen by Operator) |

The times ta, tb, and tc are all critical time between various operations and must be positive for the weighing machine to operate successfully. For example, ta represents the interval between the time when the scale door closes and the arrival time of product from the accumulator. If the product arrives at an earlier time than door closing, then some product may fall through without being weighed. Similarly, time tb represents the interval between the closing of the accumulator door and the arrival of product from the vibratory feeder. Again, the door must be closed before the product arrives; otherwise, some of the product will fall through the accumulator to the scale. Each vibratory feeder 24 has a brief hold-off period (tvh) at the end of its excitation period or duration (tVD) in order to permit product near the discharge end of the feeder to fall out of the tray into the accumulator. Following a hold-off period, there is a brief interval (tc) before the accumulator door opens to prevent product from falling directly from the feeder through the accumulator to the scale at high velocity.

The accumulator anticipation time (tAA) represents the time period during which the actuator for the accumulator door is energized as well as the actuator for the scale door. Because a certain period of time elapses between the door opening and the actual falling of the product, the energizations can overlap. A similar anticipation time (tVA) exists between the actuation of the vibratory feeder and the de-energization of the acutator operating the accumulator door.

From the above it will be apparent that there are constraints imposed on the duration tVD of the vibrator operation which cannot be exceeded. The maximum vibrator duration period (tVD) is determined by tCY, tAD, tVH, and tVA. The tVA factor and, of course, the tCY factor both have positive effects on the maximum possible duration of tVA; the other factors are all negative. For practical considerations relating to starting and stopping product feed, the duration tVD of the vibrator feeder also has a minimum period. With a given cycle time (tCY), any extension of the duration beyond the maximum period shown in FIG. 2 could cause one of the critical times (ta, tb, or tc) to be contracted to less than a positive value, and accurate feed and weighing would be lost.

In the combination weighing system illustrated, the desired or target weight to be loaded in a package 12 is obtained by selecting from among the scales 20 those scales which contain loads that in combination most nearly equal but do not fall below the target weight. The selection of scales for dumping is performed rapidly during each machine cycle by a microprocessor based scale measurement and dump control 40 in FIG. 3 in response to the weight signals received from each of the scales 20. For further description of a combination weighing system with such a control, reference may be had to pending U.S. patent application Ser. No. 430,354, filed Sept. 30, 1982, now U.S. Pat. No. 4,466,500 by Mosher and Douglas, which is incorporated herein by reference.

The number of scales in the combination weighing machine may vary, but a typical machine may contain from 10 to 14 scales, each of which is associated with a specific feeder and accumulator. As discussed above, weights near the target weight are more likely to be achieved from the combination weighing machine when the number of scales selected for dumping in each machine cycle is approximately half of the total scales in the system. For example, in a ten-scale system, the minimum departure from the target weight is most likely to be achieved when four to five scales are dumped, and in such case, the quantity of product that is dispensed by a vibratory feeder into the associated scale, that is, the desired feed weight, should be approximately one-fourth or one-fifth of the target weight.

In accordance with the present invention, the desired feed weight for each scale is controlled in a coarse manner by regulating the operation of the vibratory feeder 24 associated with the scale 20. The principal parameters controlled are the amplitude of the vibrations and the duration of vibrator operation during a single feed cycle.

Figure 3:
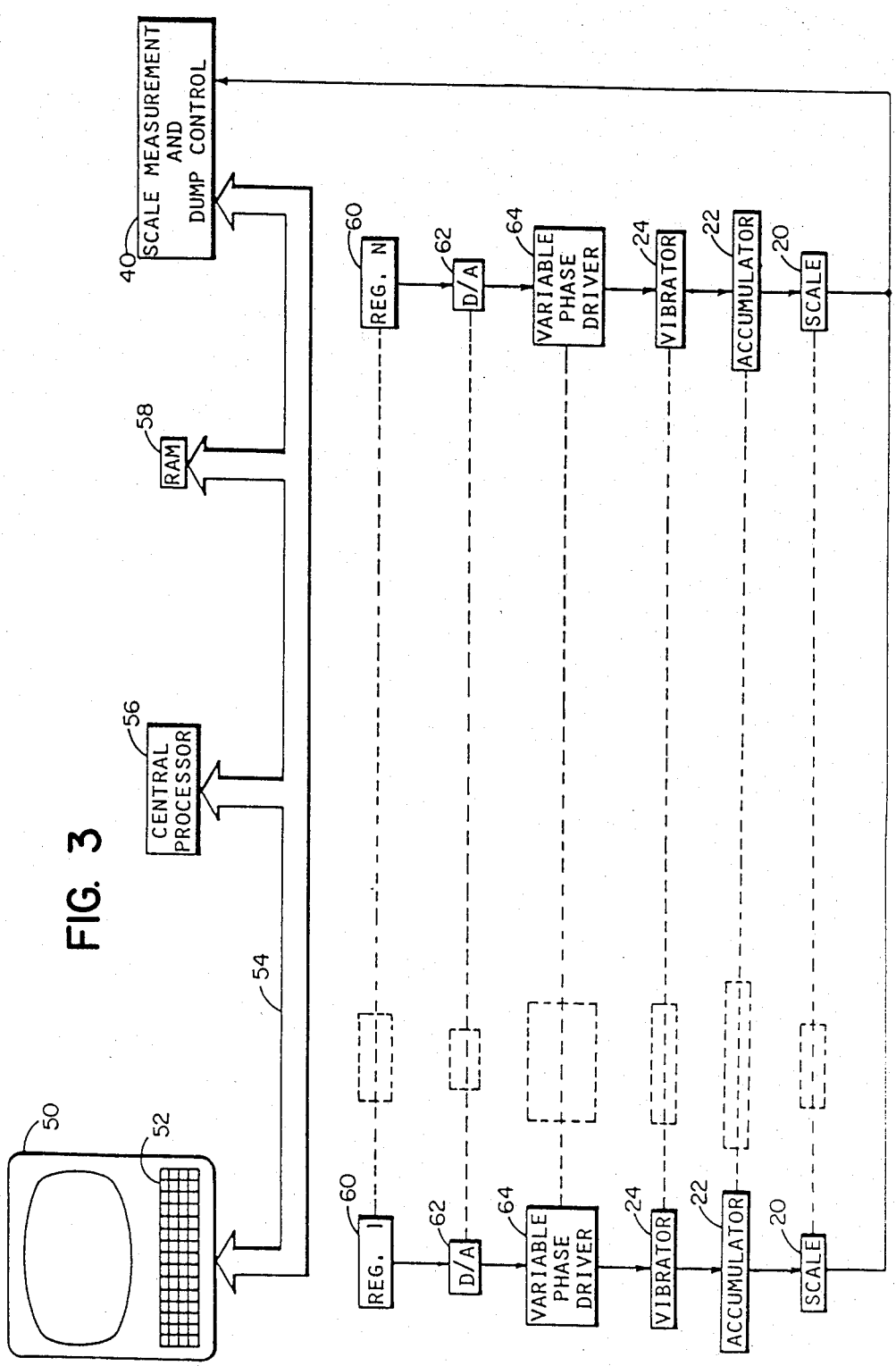
FIG. 3 is a block diagram illustrating the controls for the combination weighing system in FIG. 1.

FIG. 3 is a block diagram of the computer controls for the combination weighing machine 10 and shows the components of the machine which regulate both the amplitude and duration of the vibratory feeder operation based upon actual feed weight data measured during preceding machine cycles. The controls generate weights that approximate desired feed weights, which is desirable, because approximations provide the statistical variations which are needed to operate the combination machine successfully. Included is a display terminal 50 with a keyboard 52 through which the machine operator sets machine parameters and introduces commands which govern machine operation. The display terminal is connected to a main computer bus 54 for communication with a central processor 56, a random access memory 58, and the scale measurement and dump control 40. A commercially available processor suitable for the combination weighing system is a Model 68B09E manufactured by Motorola, Inc. In addition to controlling the processing of data within the weighing machine, the processor has an arithmetic unit that performs simple calculations as described in greater detail below. The processor in a preferred embodiment is programmed to include the functions of the scale measurement and dump control 40, but for convenience of explanation, the control 40 is identified as a component apart from the processor.

The random access memory 58 is the basic storage component of the weighing machine and stores system parameters introduced through the keyboard 52 as well as the dynamic parameters such as vibrator durations and amplitudes, which change periodically in the course of machine operation. The memory 58 is also utilized in connection with the combination search process performed by the dump control 40 and described in greater detail in the above referenced application Ser. No. 430,354.

The controls for driving each scale are identical, and for convenience, only two sets of controls are shown in FIG. 3. In the following description, the controls for one scale are explained, since the operation of the others is the same.

The feed weight dispensed by the vibratory feeder 24 varies generally in direct proportion to the amplitude of the vibrator excitation and the duration of the vibrations. Either amplitude or duration may be controlled in response to a departure of actual feed weight, as measured by the scales, from a desired feed weight, that is one-fourth or one-fifth of the target weight; however, in the preferred embodiment of the control described below, amplitude is regulated independently, and duration is regulated in response to the amplitudes of the vibrators. The interdependency of duration and amplitude prevents one parameter or the other from reaching an extreme value and forcing the other parameter to compensate in the opposite sense.

Each drive means for a vibratory feeder 24 includes a data register 60 which stores a commanded amplitude level in digital form. In one embodiment, an eight-bit register is provided which allows 256 equally spaced levels of amplitude adjustment. The register is connected to the main bus 54, and the central processor 56 loads a commanded amplitude level into the register each time a new amplitude calculation is made. In the preferred embodiment, adjustment of the amplitude level is made during each machine cycle after the associated weigh scale has produced a signal indicative of the weight of product loaded in the scale. Of course, each scale has its own feeder, and therefore, the number of calculations per cycle is equal to the number of scales that receive a new load. It is possible to reduce the number of calculations by correcting the amplitude less frequently, such as after every two or three dumping operations.

A digital-to-analog converter 60 reads the commanded amplitude level from register 60 and controls a variable phase driver 64, which excites an electrical vibrator of the feeder 24. The variable phase driver 64 includes a conventional solid state phase controller which energizes the vibrator with conventional AC power for various phases of each power cycle. In the preferred embodiment, the 256 equally spaced levels of control permitted by the eight-bit register 60 are converted to a DC voltage level by the converter 62, and the variable phase driver 64 is voltage controlled to modulate the AC power at any phase angle between zero and 180 degrees. Accordingly, the driver 64 assumes 256 distinct levels of control over the AC power supplied to the vibrator of the feeder 24 and makes corresponding adjustments in the amplitude of the vibratory oscillations. In practice, low level vibrations are inadequate to have any effect upon many packaged products, due to their consistencies, tackiness, and other properties, and accordingly, regulation of the amplitude below a minimum level is not required or desirable.

Figure 4:
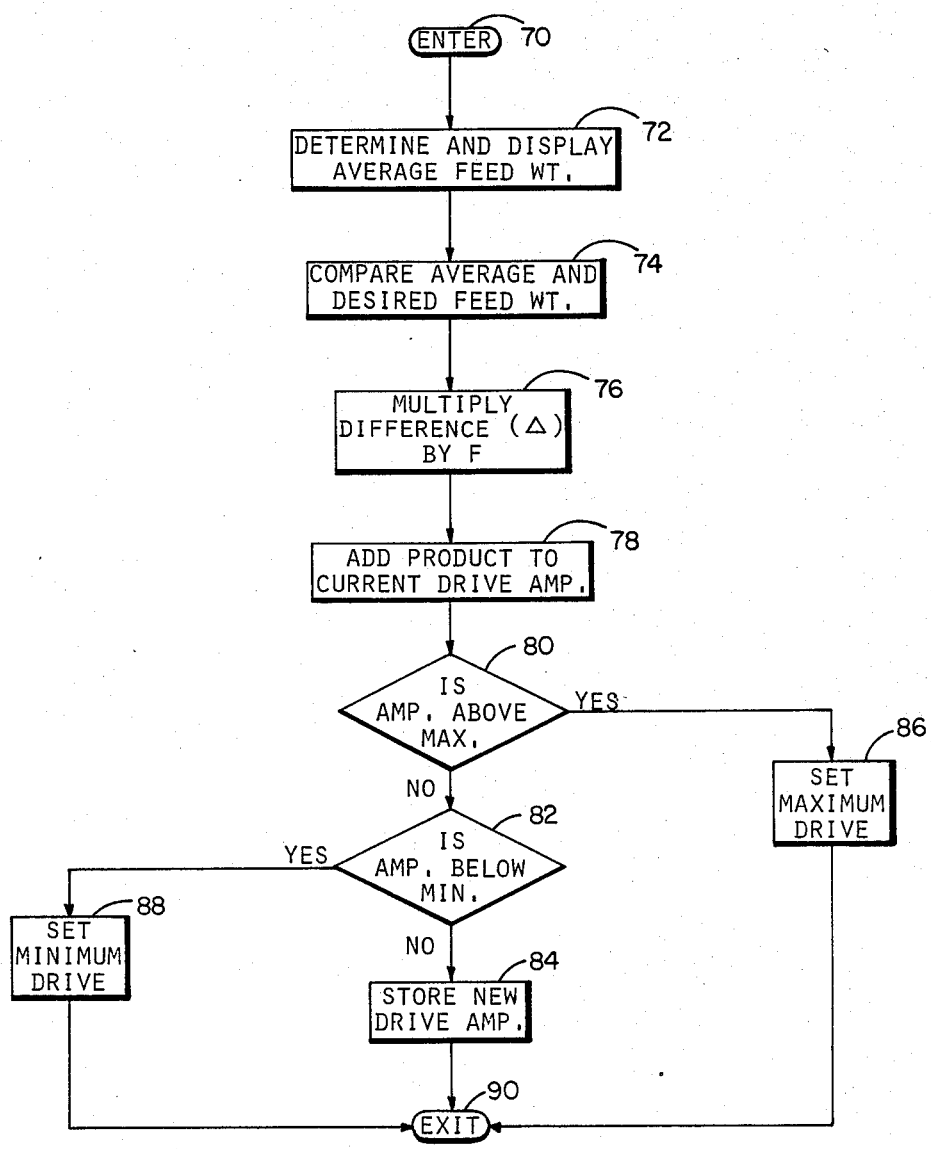
FIG. 4 is a flow chart detailing a problem subroutine for regulating the amplitude of vibrator operation.

FIG. 4 illustrates the flow chart that defines a subroutine of the machine program in the processor 56 for determining the amplitude command loaded into the register 60. The subroutine is entered at 70 immediately after the associated scale 20 transmits a weight signal to the scale measurement and dump control 40 in FIG. 3. At instruction 72, the subroutine first determines an average of the feed weights that have been supplied to the scale in previous loadings and displays the average in the terminal 50. The previously measured weights become samples upon which amplitude of the next cycle or cycles of operation is based. One method for averaging is to utilize the feed weights that were measured by the scales in a predetermined number of weighing cycles immediately preceding the calculation. Another method of averaging that provides a more comprehensive history with emphasis on the most recent measurements is preferred. In the preferred method, all prior measurements from the scale are weighted in a number stored in memory, and the weighted number is divided by a scale factor, such as 4, to define the average feed weight. When a new feed weight is measured, the average feed weight is subtracted from the weighted number in memory, and the new feed weight is added to establish a new weighted number. Repetition of this process provides an average feed weight in which the most recent weights are more significant and the older weights decay in significance with each succeeding weighing cycle.

After an average feed weight is determined, the average is compared with the desired feed weight at instruction 74, and the difference is multiplied by a factor F at instruction 76. The product of the multiplication is a scaled number representing the departure of the average feed weight from the desired feed weight, and that departure is added at instruction 78 to the current drive amplitude in register 60 to obtain the new amplitude. Alternately, the latest feed weight, rather than an average, may be compared with the desired feed weight, and the addend used in instruction 78 can be derived from a look-up table.

The new drive amplitude is tested against a maximum drive level at branch 80, and if the maximum level is not exceeded, the new amplitude is also tested against a minimum desired drive level at branch 82. If the new drive amplitude is not less than the minimum, then the amplitude is stored by instruction 84 in the register 60 in preparation for the next operation of the feeder 24.

In the event that the new drive amplitude does exceed the maximum level, then instruction 86 limits the amplitude set in the register at the maximum level. Correspondingly, if the new drive amplitude is less than the minimum, then instruction 88 sets the register at the minimum level. Regardless of whether the drive level is set by instruction 84, 86, or 88, the newly commanded level is also stored in memory for calculating the new drive level in the next cycle of operations at instruction 78. The subroutine is then exited at 90.

The register 60 is updated with the new drive amplitude after each loading cycle. Since the calculation is based upon a measured weight produced by the vibrator two cycles earlier, there is a two-cycle lag in the regulation of vibrator amplitude. This lag does not adversely affect the servo response of the amplitude controls, provided that the correction factor F utilized in instruction 76 does not overdrive the system and produce rapid and extreme variations in the amplitude.

Regulation of the period or duration of vibrator operation is based upon the existing amplitude levels stored in memory 58 and registers 60. The dependency of duration on amplitude lends stability to the controls, and the particular dependency of duration on amplitude is advantageous. It has been noted that better resolution of control over the feed weight is obtained through amplitude variations than through duration variations. Normally, machine cycles range from 1 to 2 per second, which results in maximum vibrator durations in the range 0.2 to 0.5 seconds. Typical changes in vibrator duration are 0.02 to 0.1 second, and without synchronization, such incremental modulations of standard AC power (100 to 120 hz.) at random phase angles do not provide as accurate control over the quantity of product fed to the accumulators as modulation of the amplitude throughout the period of excitation. Accordingly, since vibrator amplitude has better resolution, finer adjustment of the feed weights is obtained, and adjustment of vibrator durations can be restrained to less frequent occasions, such as once during every ten cycles of machine operation.

Figure 5:
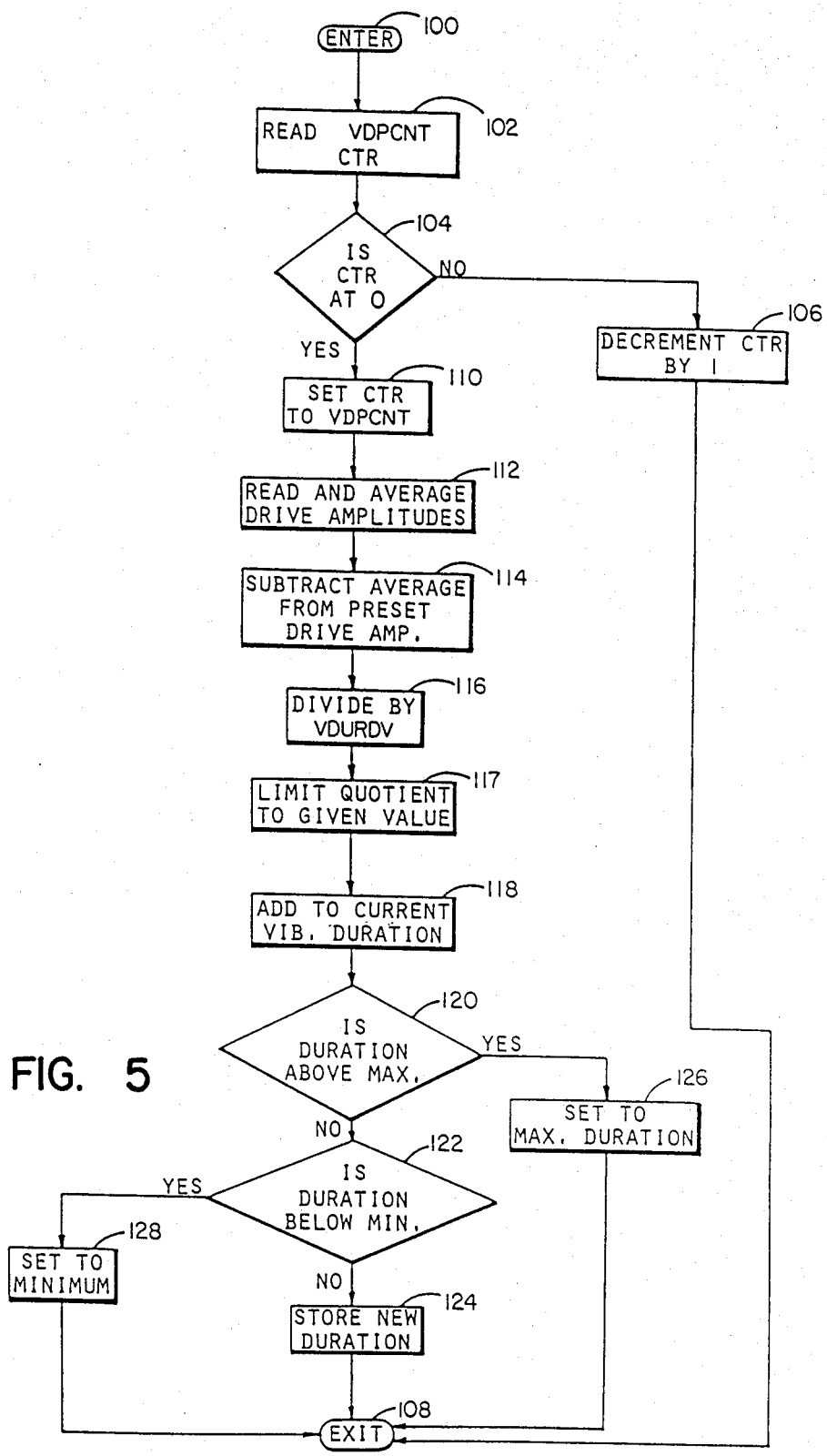
FIG. 5 is a flow chart detailing a program subroutine for regulating the duration of vibrator operation.

FIG. 5 illustrates the subroutine of the program in central processor 56 for regulating vibrator duration. The duration control subroutine is a common control for all of the scales in the weighing machine, and thus, establishes a uniform vibration duration for each feeder. However, if desired, the subroutine may be utilized on a time-shared basis or may be duplicated so that the duration of each feeder operation can be controlled separately.

The subroutine is entered at 100 once during each machine cycle. To determine if adjustment of the vibrator duration is appropriate during any particular cycle, the first instruction 102 reads a vibrator drive period correction count (VDPCNT) in a counter within the processor 56, and branch 104 determines if the count is zero, indicating that adjustment of the vibrator duration is due. If the count is not zero, then the program advances immediately to instruction 106 which decrements the counter by 1, and the subroutine is exited at 108. Decrementing at instruction 106 during each machine cycle causes the counter to reach zero at regular intervals of operation, and causes duration adjustments to occur less frequently than the amplitude adjustments. This is necessary because amplitude changes are finer than duration changes.

When the counter is zero, branch 104 advances the program to instruction 110 and resets the counter to the preselected count (VDPCNT) that has been established in the memory 58 as one of the parameters by the control program. For example, if the counter is set at 10, then the duration of the vibrator operation is set once during every 10 machine cycles.

At instruction 112, the program reads the current drive amplitudes in memory and registers 60 for all scales and calculates an average amplitude value. This average amplitude provides a general indication of the current success that the individual amplitude controls are having in meeting the desired feed weights. To regulate the duration of the vibratory feeder operations, the average value is then subtracted at instruction 114 from a nominal amplitude value that is preset by the machine operator in memory 58. The error or difference from the subtraction process performed in instruction 114 is divided at instruction 116 by a preset vibrator duration divisor (VDURDV) which scales the difference in terms of fractions of a second, such as one-hundredths of a second, for algebraic addition to the current vibrator duration period at instruction 118. Before addition, however, instruction 117 checks the quotient from the operation in instruction 116 against preset value to restrict duration changes to a maximum.

The new duration period is then checked against a maximum permitted duration at branch 120 and a minimum duration at branch 122. If neither limit is exceeded, the new duration is stored in memory to control the duration of each of the vibrators for the next series of machine cycles. If the new duration exceeds the maximum, then instruction 126 limits the set duration to the maximum value, and if the new duration is below the minimum, a minimum value is set by instruction 128. When the new value has been set, the program is exited at 108.

Accordingly, a combination weighing system has been disclosed with automatic controls for regulating the vibratory feeders in response to the difference between a dispensed feed weight and a desired feed weight. Signals representative of the difference are utilized to control the amplitude and the duration of operation of the vibratory feeders for the scales. By regulating the feeders in this manner, the desired feed weights are more closely approximated and the probability of obtaining a target weight is greatly improved in a combination weighing machine.

Regulation of the vibratory feeders can also be used to feed small quantities of product into certain scales which are then more likely to combine with relatively stagnant or inactive scales. Returning an inactive scale to an active status increases the statistical probability of approaching the target weight with greater accuracy.

For example, a scale which receives a large quantity of product that is slightly less than the desired target weight will, in all probability, not combine readily with any of the other scales in a combination which closely approximates the target weight. As a result, such scale stagnates with its excess feed weight and effectively reduces the combination weighing machine from one with n scales to one with n−1 scales. The loss depreciates the utility of the machine. By appropriately adjusting the desired feed weight utilized in the amplitude subroutine for one or more of the remaining scales, the probability of developing a combination which includes the inactive scale is significantly improved.

Figure 6:
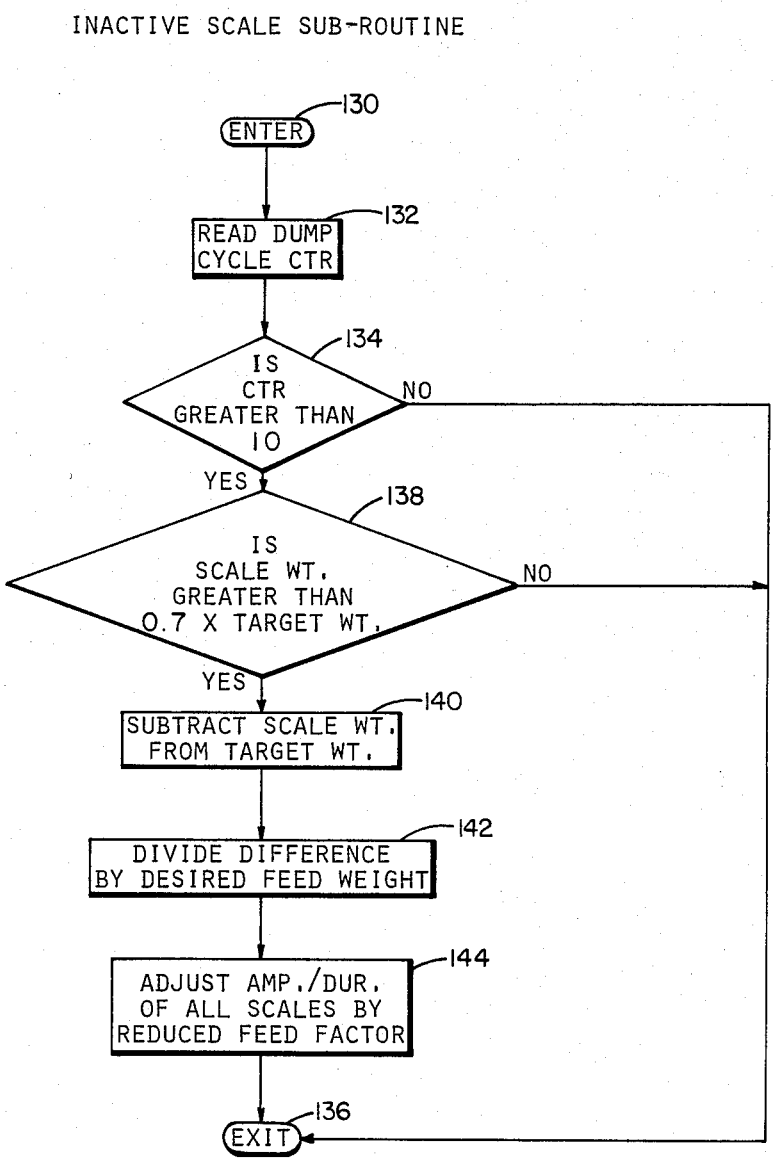
FIG. 6 is a flow chart detailing a program subroutine for causing an inactive scale of the combination weighing machine to fit into a dumped combination through feeder control.

FIG. 6 illustrates a short subroutine that enables the desired feed weight to be adjusted in accordance with the actual weight in a relatively inactive scale. The subroutine is employed once during each machine cycle for each of the scales in the machine after the selected scales have been dumped. The subroutine is entered at 130 and at instruction 132 immediately reads a dump cycle counter that monitors the number of machine cycles that have elapsed since the scale was last dumped. Branch 134 determines if more than ten machine cycles have elapsed since the last dump of the scale, and if the determination is negative, the scale is not considered inactive, and the subroutine is exited at 136.

If the scale has not been dumped in more than ten cycles, then the actual feed weight is compared with 0.7 of the target weight at branch 138 to determine if an excessively large quantity of product has rendered the scale inactive and thus unable to combine with other scales of lesser weights in a best combination for dumping. If the determination is negative, then the program is exited at 136. The theory that an inactive scale may have excessive weight can be supplemented by dispensing a second quantity of product from the accumulator into the scale when the scale has remained inactive for 20 or more cycles. The intent of reloading the scale is to make up for an inadequate charge of product that also may not combine well with the other scales in a preferred combination. In the latter event, it is possible for the inactive scale to readily reach 0.7 of the target weight in a few cycles of the machine.

In the event that the scale contains excessive weight as determined at branch 138, instruction 140 subtracts the scale weight from the target weight and instruction 142 divides that difference by the desired feed weight. The quotient from instruction 142 is then utilized as a factor to reduce the amplitude or duration of feed on all scales by instruction 144 for the next and all subsequent machine cycles until the inactive scale is dumped. Under these circumstances, the amplitude or duration, or both, for all of the scales that require reloading, is reduced substantially by the reduced feed factor, and the reloaded scales receive relatively small quantities of product which are more likely to combine with the inactive scale in "a best combination" and be dumped into a package. If the weighing machine must proceed through several additional machine cycles before a best combination including the inactive scale is dumped, more scales with reduced quantities of product will be created and increase the probability of including the inactive scale in the best combination. When the inactive scale is dumped, the feeder controls are automatically restored to the normal duration and amplitude mode of operation as described in connection with FIGS. 4 and 5.

Figure 7:
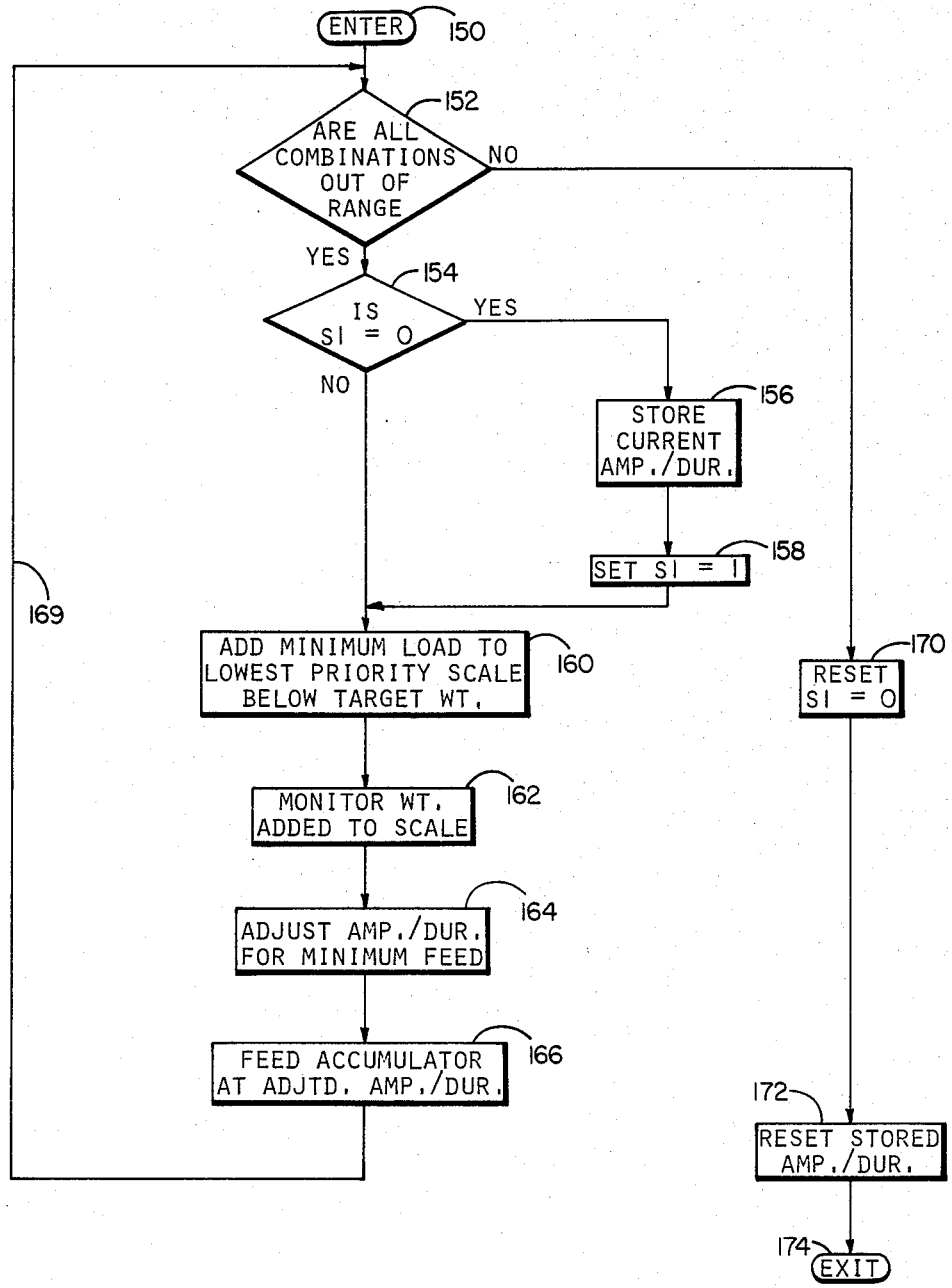
FIG. 7 is a flow chart detailing a program subroutine bringing combinations out of a set range of the target weight within range through feeder control.

FIG. 7 reveals a further embodiment of the present invention that enables the combination weighing machine to work itself out of a condition in which none of the combinations produces a resultant weight that is within a defined range of the target weight. A simple example of this condition is as follows. Assuming that the combination weighing machine has eight or more scales, and each of the scales is loaded with 19 grams of product. The minimum weight in excess of a target weight of 100 grams that could be produced by the scales would be 114 grams. If the weighing machine is set to accept only combinations which produce packages not less than the target weight of 100 grams and not exceeding a reject weight of 110 grams, then all of the combinations would automatically be rejected by the machine. Under such circumstances, the machine stalls because none of the scales is dumped, and none of the combinations satisfies the range limitations. The machine operator must then intervene and remove product from some scales or dump some of the scales in order to create a new series of combinations that may satisfy the range criteria.

The vibratory feeder controls may be utilized as described below to allow the weighing machine to automatically generate combinations that fall within range without human intervention and without dumping all or even some of the scales. FIG. 7 illustrates a subroutine of the weighing machine program which is entered at 150 during each cycle of the machine after a combination search, as described in the above-referenced application Ser. No. 430,354, has been completed. Initially, branch 152 determines if all of the combinations searched are out of range, that is, are either less than the target weight or exceed the target weight by a fixed amount. If the combinations are all out of range, the subroutine advances to branch 154 and determines if a flag S1 is in a zero-state set during initialization steps. If the flag is not in the zero-state, the program advances directly to instruction 160, but during the first pass through branch 154, the flag shows a zero and therefore the program advances to instruction 156, which causes the current amplitude and duration values to be stored in memory. Then instruction 158 sets the flag S1 to the one-state, and the program advances to instruction 160, which dispenses the product previously loaded in the accumulator into the lowest priority scale that carries a quantity of product less than target weight. For example, the scales may arbitrarily be assigned priority numbers simply to enable the subroutine of FIG. 7 to identify a single scale for working the weighing machine out of the stalled condition. Other criteria for selecting single scales in an orderly basis may be used.

After the accumulator has loaded the lowest priority scale, instruction 162 monitors the change in weight to determine the weight added. Instruction 164 adjusts the amplitude and/or duration of the vibrator feeding the low priority scale in order to minimize the amount of product fed and thereby incrementally increase the total weight of product in the scale. Instruction 166 then causes the vibratory feeder to load the accumulator at the adjusted amplitude or duration with a minimal quantity of product. The new combinations are searched by following the loop 169, and a determination of the out-of-range condition is again made at instruction 152.

The purpose of incrementally increasing the charge of product in the low priority scale is to establish new weight combinations which differ incrementally from the combinations which previously did not fall within range. Generally, the goal of producing a combination within range is not achieved during the first cycle through the loop 169, because a full charge of product has already been loaded into the accumulator before the out-of-range condition is detected at branch 152. Consequently, when the subroutine returns to branch 152 the first time and re-examines the combinations, the probability of finding combinations that are now in range are minimal. During the second pass through the branch 154, flag S1 will be in the one-state, and as a result, the subroutine advances directly to instructions 160, 162, 164, and 166 and preserves the previously stored amplitude and duration values. It will be observed that as the loop 169 is followed in successive cycles, instructions 162 and 164 cooperate to adjust the vibratory feeder so that a minimum amount of product is fed to the vibrator. For example, if the amplitude or duration or both have been reduced to such a low level that nothing is fed, suitable upward adjustments are made. On the other hand, if more than a minimum quantity of product has been fed, suitable downward adjustments are made.

In each subsequent cycle through instruction 160, a minimum quantity of product is added to the lowest priority scale, and the weight of product in that scale gradually builds up. In most instances, the increased weight of the lowest priority scale will eventually produce a combination that falls within range, and the corresponding scale or scales are dumped. However, if the incremental additions of product to the lowest priority scale cause that scale to reach a weight that is in excess of the reject weight without first reaching a weight between target and reject, instruction 160 signals the condition to the machine operator to attend the scale and shifts the incremental loading function sequentially to the scale next lower in priority.

Eventually, a combination of scales is detected which falls within range of the target weight, and that set of scales is dumped. Branch 152 detects the condition and advances the program to instruction 170 where flag S1 is reset to the zero-state. Instruction 172 resets the amplitude and duration of values that were stored by instruction 156 when the out-of-range problem was originally detected. Thus, the system is returned to its previous operating condition and resumes normal operation with amplitude and duration of the feeder operation being adjusted during each machine cycle as described above. The subroutine is exited at 174.

While the present invention has been described in a preferred embodiment, it should be understood that numerous modifications and substitutions can be had without departing from the spirit of the invention. Although the amplitude regulation subroutine may be called up and employed during each cycle of machine operation, less frequent use of the subroutine, like the duration subroutine, is also contemplated. Similarly, the duration subroutine may be used during each machine cycle rather than at less frequent intervals as described. The duration subroutine may be employed individually for each feeder and associated scale by utilizing the feed weight of the associated scale rather than an average feed weight from all scales. Also, the duration subroutine may be operated independently of amplitude by utilizing the weight difference signal employed in the amplitude subroutine. Accordingly, the present invention has been described in a preferred embodiment by way of illustration rather than limitation.

We claim:

1. A combination weighing machine having a plurality of scales weighing quantities of a product and being selectively dumped in combination in a cyclic operation to form a package containing the product at or closely approximating a target weight, including a plurality of vibratory product feeders associated respectively with the scales for loading the product quantities in different and controlled amounts into the respective scales comprising:

scale measuring means for separately measuring the weight of product loaded into each respective scale from the associated vibratory feeder during loading operations;

comparing means for determining from the weights of product measured in each scale after loading and desired feed weights established for the respective scales error signals for the scales, the signals being uniquely associated with the scales and representing the departures of the measured weights from the desired feed weights whereby an independent error signal is established for each scale after loading; and vibrator control means connected with the comparing means and responsive to the independent error signals for setting the operation of each of the vibratory feeders in advance of feeding and independently of the other feeders, each error signal being applied solely to the vibratory feeder associated with the scale from which the error signal was determined to regulate a loading operation subsequent to a weight measurement and to load product quantities in the scales at statistically variable weights more closely approximating the desired feed weights.

2. A combination weighing machine having a plurality of scales as defined in claim 1 wherein:

each of the vibratory feeders has a vibrator excited at a controlled amplitude; and the vibrator control means includes means for regulating the amplitude of the vibrator excitations in response to the error signal.

3. A combination weighing machine having a plurality of scales as defined in claim 1 wherein:

each of the vibratory feeders has a controlled period of operation in loading the associated scale; and the vibrator control means includes means for regulating the amplitude of vibrator excitation and means for regulating the duration of the period of vibrator operation in response to the departure of the regulated amplitude of the vibrator excitations from a preselected amplitude.

4. A combination weighing machine having a plurality of scales as defined in claim 1 wherein:

each of the vibratory feeders has a controlled period of operation in feeding a quantity of product to the associated scale in a cycle of operation, and the vibrator control means includes means for setting the duration of the period of operation of each feeder in accordance with the error signal produced by the associated scale.

5. A combination weighing machine having a plurality of scales as defined in claim 4 wherein:

each of the vibratory feeders has a controlled amplitude of operation in feeding a quantity of product to the associated scale; and the vibrator control means further includes means for setting the amplitude of the vibrator in accordance with the error signal produced by the associated scale.

6. A combination weighing machine having a plurality of scales as defined in claim 5 wherein the means for setting the duration of feeder operation includes means for limiting the setting of duration to intervals less frequent than each cycle of machine operation.

7. A combination weighing machine having a plurality of scales as defined in claim 5 wherein the means for setting the duration of feeder operation includes means for limiting the setting of duration to intervals less frequent than the amplitude setting.

8. A combination weighing machine having a plurality of scales as defined in claim 1 wherein
each of the vibratory feeders has a vibrator excited at a controlled amplitude for a limited duration following dumping of the associated scale;
the vibrator control means includes means for setting the amplitude of the vibrator excitations of each feeder in accordance with the error signal produced from the associated scale; and
the comparing means includes averaging means for determining from the measured total weights an average of the feed weights fed to the respective scales in previous loading of the scales from the feeders and means for comparing the averaged feed weight with a desired feed weight.

9. In a combination weighing machine having a plurality of weigh scales for cyclically measuring quantities of a product and producing a signal indicative of the weight of product in the scale and dumping the quantities of selected scales into a single package at or approximating a target weight, and including a plurality of vibratory product feeders for dispensing individual quantities of product from a bulk container to the weigh scales, an improved apparatus for controlling the operation of the vibratory feeders for each scale comprising:
means for detecting weigh scales in the machine which remain inactive for a plurality of consecutive machine cycles;
adjustable vibrator drive means connected with each vibratory feeder for exciting the feeder of each scale independently with different degrees of energization to dispense different quantities of product to the scales; and
means for adjusting the vibrator drive means to feed incremental quantities of product to scales requiring reloading in response to the detection of an inactive scale by the detecting means.

10. An improved apparatus for controlling the feeders as defined in claim 9 wherein the means for detecting inactive scales comprises a dump cycle counter which counts the number of dump cycles of the machine between dumps of each scale.

11. A method of operating a combination weighing machine having a plurality of weigh scales from which a preferred combination of scales is selected during each machine cycle to form a package of product at an approximate target weight comprising:
monitoring each of the scales in the machine and identifying scales which have become inactive by not dumping product for a plurality of consecutive machine cycles; and
reducing to a small amount the quantity of product fed to scales requiring reloading during subsequent machine cycles until the identified inactive scales are dumped.

12. Method of operating a combination weighing machine as defined in claim 11 wherein the step of reducing comprises reducing the amplitude of vibratory feeders loading the scales requiring reloading.

13. Method of operating a combination weighing machine as defined in claim 11 wherein the step of reducing comprises reducing the duration of operation of vibratory feeders loading the scales requiring reloading.

14. A method of controlling a plurality of vibratory feeders which dispense quantities of product in different and controlled amounts from a bulk container to a plurality of associated weigh scales in a combination weighing machine to weigh the quantities being selected in various combinations from the scales in each cycle of machine operation and form a single quantity of product at or closely approximating a given target weight, the different and controlled amounts of product dispensed being regulated by the vibrations of the feeders, comprising for each scale the steps of:
measuring the weight of product dispensed from a feeder to the scale in a given dispensing operation;
comparing the dispensed weight against the desired feed weight of the scale to establish a difference; and
setting the vibrations of the feeder for the scale to regulate the different and controlled amounts of product dispensed in advance of feeding and independently of the other feeders in a subsequent dispensing operation and to minimize the difference between the weight of product dispensed and the desired feed weight whereby statistically varying weights more closely approximating the desired feed weights are fed to each scale.

15. A method of controlling the vibratory feeders as defined in claim 14 wherein the step of setting comprises setting the amplitude of the vibrations to increase the dispensed weight when the measured weight is less than the desired weight and decreasing the amplitude of the vibrator operations when the dispensed weight is greater than the desired weight.

16. A method of controlling the vibratory feeders as defined in claim 14 wherein the step of setting additionally includes increasing the period of vibrator operation during a given dispensing operation to increase the weight of product dispensed and decreasing the period of vibrator operation to decrease the weight of product dispensed.

* * * * *